United States Patent
Colloff et al.

(10) Patent No.: US 7,209,476 B1
(45) Date of Patent: Apr. 24, 2007

(54) METHOD AND APPARATUS FOR INPUT/OUTPUT PORT MIRRORING FOR NETWORKING SYSTEM BRING-UP AND DEBUG

(75) Inventors: Ian Colloff, Los Gatos, CA (US); Norman Chou, San Jose, CA (US); Richard L. Schober, Cupertino, CA (US); Mercedes Gil, Fort Collins, CO (US); Edmundo Rojas, Fort Collins, CO (US); Zhang Xiaoyang, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 949 days.

(21) Appl. No.: 09/977,604

(22) Filed: Oct. 12, 2001

(51) Int. Cl.
*H04L 12/50* (2006.01)

(52) U.S. Cl. .................................. 370/360
(58) Field of Classification Search ............. 370/250, 370/390, 422, 360, 380, 423, 427
See application file for complete search history.

(56) References Cited

U.S. PATENT DOCUMENTS

| | | | |
|---|---|---|---|
| 5,592,476 A * | 1/1997 | Calamvokis et al. ....... | 370/390 |
| 5,615,161 A | 3/1997 | Mu | |
| 5,644,604 A | 7/1997 | Larson | |
| 5,740,346 A | 4/1998 | Wicki et al. | |
| 5,768,300 A | 6/1998 | Sastry et al. | |
| 5,838,684 A | 11/1998 | Wicki et al. | |
| 5,892,766 A | 4/1999 | Wicki et al. | |
| 5,931,967 A | 8/1999 | Shimizu et al. | |
| 5,959,995 A | 9/1999 | Wicki et al. | |
| 5,987,629 A | 11/1999 | Sastry et al. | |
| 5,991,296 A | 11/1999 | Mu et al. | |
| 6,003,064 A | 12/1999 | Wicki et al. | |
| 6,449,576 B1 * | 9/2002 | Bass et al. .................... | 702/117 |
| 6,813,274 B1 * | 11/2004 | Suzuki et al. ................ | 370/412 |
| 2002/0019882 A1 * | 2/2002 | Soejima et al. ............. | 709/249 |

OTHER PUBLICATIONS

Robin et al, Infiniband Architecture, Intel Developer Forum, pp. 1-79, 2000.*
Motorola, RAPIDIO: An Embedded System Component Network Architecture, pp. 1-25, Feb. 2000.*
"InfiniBand Switch Chip Runs at 10 Gbps On Eight Ports", Nicholas Cravotta, Nov. 8, 2001, EDN, 1 page.
"Assemble Fast Switch Fabrics With 32-Port InfiniBand Node p. 60", Electronic Design, Oct. 15, 2001, 4 pages.
"RedSwitch, Inc. Announces Industry's Highest Performance and Highest Integration InfiniBand Switch Chip", RedSwitch Press Release, Oct. 16, 2001, 2 pages.
"RedSwitch Gearing Up To Launch New Chip", Steve Tanner, Silicon Valley Business Ink, Oct. 26, 2001, 3 pages.
"Mellanox Integrates Serdes Into Infiniband Switch", Jerry Asciento, EE Times, Oct. 23, 2001, 3 pages.

(Continued)

*Primary Examiner*—Frank Duong (57) ABSTRACT

A networking system includes a plurality of ports, each adapted to send and receive data. A switch core has a first channel configured to receive a logical input flow from each of the plurality of input ports, and has a second channel configured to receive a raw input flow from each of the plurality of input ports. Each logical input flow is carried by its corresponding raw input flow. A plurality of port mirrors are selectable from the plurality of ports. Each of the plurality of port mirrors is configured to produce a duplicate copy of at least one of the logical input flow and the raw input flow available at a selected port.

20 Claims, 5 Drawing Sheets

OTHER PUBLICATIONS

"Switch Chip Expands InfiniBand Integration", EEM File 3130, Tony Chance, 2 pages.

"RedSwitch Announces 16 Gbyte/s Throughout Switch Product for RapidIO Architecture", RedSwitch Press Release, Milpitas, Calif., May 15, 2001, Tony Chance,May 15, 2001 , 2 pages.

"RedSwitch and Agilent Technologies Unveil 160-GB/s Throughout Switch Product for InfiniBand Architecture", RedSwitch Press Release, Intel Developer Forum Conference, San Jose, Calif., Feb. 27, 2001, Mark Alden-Agilent, Tony Chance-Red Switch, 2 pages.

* cited by examiner

METHOD AND APPARATUS FOR INPUT/OUTPUT PORT MIRRORING FOR NETWORKING SYSTEM BRING-UP AND DEBUG

FIELD OF INVENTION

The field of invention relates generally to system bring-up and debug; and more specifically to a method and apparatus for input/output port mirroring

BACKGROUND

Figure 1:
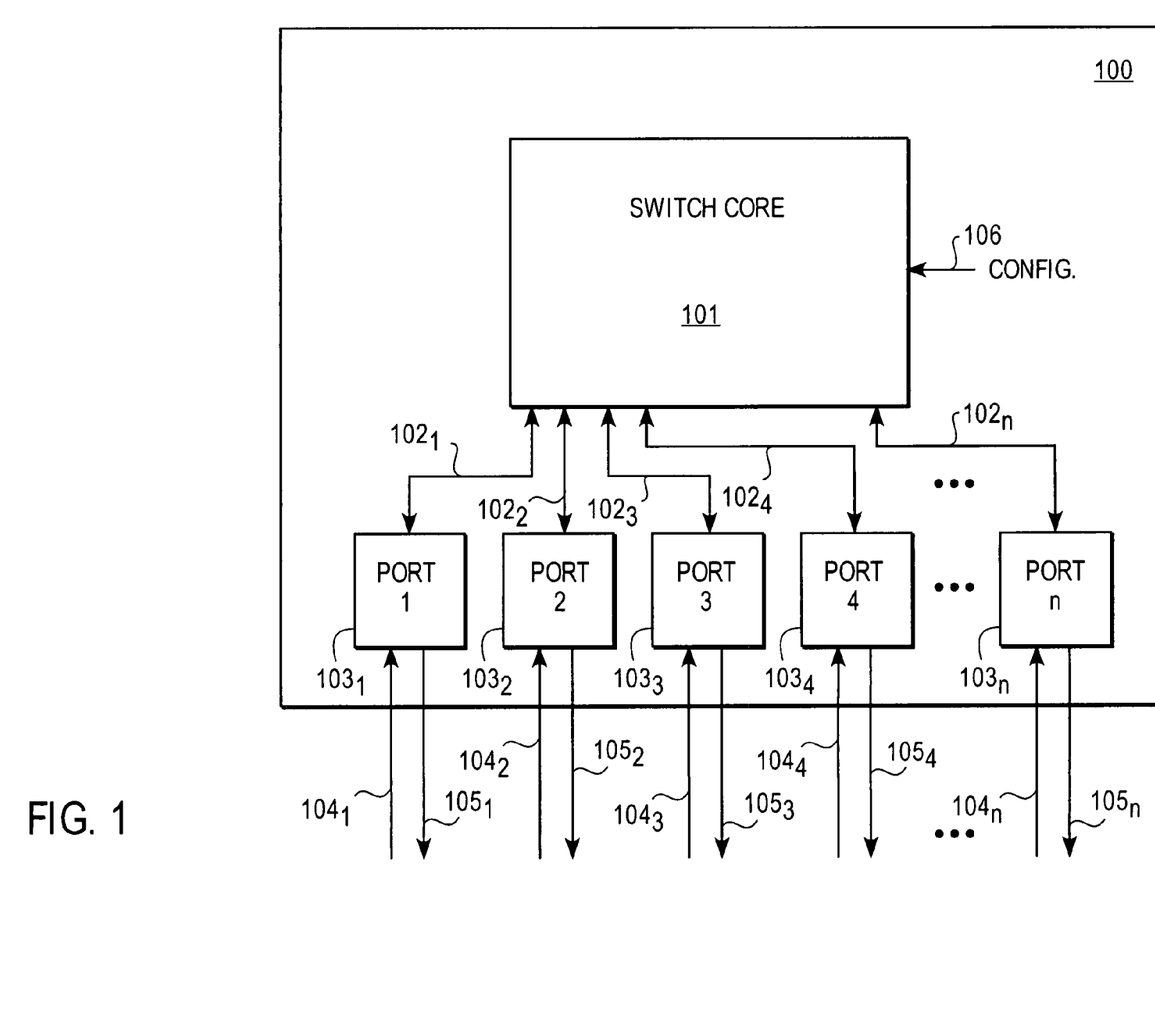
FIG. 1 shows an embodiment of a networking system.

FIG. 1 shows an example of a typical networking system 100. A networking system 100 may be viewed as having a plurality of ports (e.g., "n" ports $103_1$ through $103_n$) each of which are responsible for collecting the input/output traffic to/from and a particular agent (e.g., a client or group of clients, a user or group of users, another networking system or group of networking systems, a portion of the bandwidth on a networking line, the bandwidth of a networking line, the bandwidth of more than one networking line, etc.) that is in communication with the networking system 100. Input traffic and output traffic may take various forms such as streams of packets, datagrams, cells, frames, etc.

As mentioned just above, a port is usually allocated for each agent that the networking system 100 is in communication with. Thus, if the networking system 100 is in communication with "n" agents, n ports $103_1$ through $103_n$ can be established as observed in FIG. 1. Generally, the granularity and definition of each agent (e.g., an individual user vs. an entire system; a portion of a line's bandwidth vs. the combined bandwidth from a group of lines, etc.) are configurable on a port-by-port basis and may therefore vary from port-to-port.

The communication with the agents by the networking system 100 is represented by inbound traffic flows $104_1$ through $104_n$ and outbound traffic flows $105_1$ through $105_n$. That is: 1) port $103_1$ represents a first agent: a) that is in communication with the networking system, and b) that sends inbound traffic $104_1$ and receives outbound traffic $105_1$; 2) port $103_2$ represents a second agent: a) that is in communication with the networking system 100, and b) that sends inbound traffic $104_2$ and receives outbound traffic $105_2$, etc.

As traffic is received at a port, the services of the switching core 101 are requested. For example, for each inbound traffic unit received by a port, a service request (or other similar notification) is made by the port to the switching core 101. The services provided by the switching core 101 include: 1) identification of the port from where the traffic unit should be emitted from (as part of any of outbound traffic flows $105_1$ through $105_n$); and, 2) transportation of the inbound traffic unit from the port where it was received to the just aforementioned port where it should be emitted from.

The former port (i.e., the port where the inbound traffic unit is received) may be referred to as the "input port" for the traffic unit; and, the later port (i.e., the port where the traffic unit should be emitted from as outbound traffic) may be referred to as the "output port" for the traffic unit. As such, the switching core 101 effectively connects and manages the transferal of each received packet from its input port to its output port.

For example, for a networking connection that corresponds to a communication between the agent associated with port $103_1$ and the agent associated with port $103_n$, the switching core 101 transfers packets received at port $103_1$ (as part of inbound flow $104_1$) associated with this communication to port $103_n$. Thus, a packet that is received at port $103_1$ and destined for the agent associated with port $103_n$ will be transmitted to the switching core 101 from port $103_1$ along core interface $102_1$. Subsequently, the switching core 101 will direct the packet from the core 101 to port $103_n$ along core interface $102_n$. As a result, the packets will be part of outbound flow $105_n$ and the connection between the pair of agents will be established.

Networking systems are difficult to de-bug during their development ("bring-up"), however. The complicated procedure of routing streams of inbound traffic units to their appropriate input port, switching or routing the traffic units to their appropriate output port; and, their subsequent transmission into streams of outbound traffic units makes it difficult to detect where a problem has arisen if traffic units are being processed incorrectly.

SUMMARY

One aspect of the present invention provides a networking system. The networking system includes a plurality of ports, a switch core and a plurality of port mirrors. The plurality of ports are adapted to send and receive data. The switch core includes a first channel configured to receive a logical input flow from each of the plurality of input ports, and a second channel configured to receive a raw input flow from each of the plurality of input ports. The plurality of port mirrors is selectable from the plurality of ports. Each of the plurality of port mirrors is configured to produce a duplicate copy of at least one of the logical input flow and the raw input flow available at a selected port.

FIGURES

The present invention is illustrated by way of example, and not limitation, in the Figures of the accompanying drawings in which.

DETAILED DESCRIPTION

Figure 2:
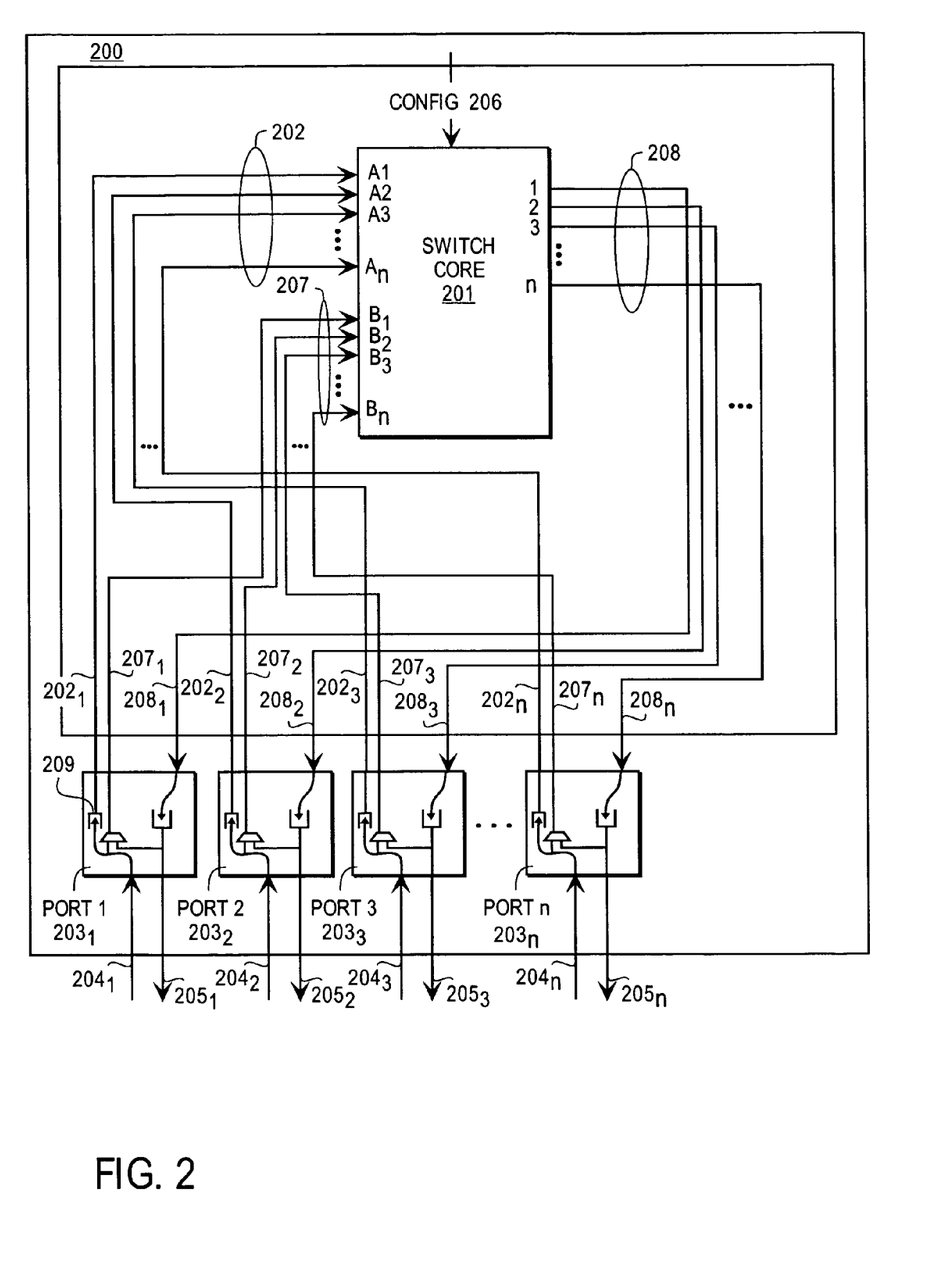
FIG. 2 shows an embodiment of a networking system having a pair of ports that may be used for system debug and bring up.

FIG. 2 shows an embodiment of a networking system 200 that can make the debugging effort easier. In order to understand how the debugging effort can be made less burdensome, a preliminary discussion as to how the networking system 200 can be designed will be first be provided. In particular, note that the architecture of the system 200 may be designed such that the individual ports $203_1$ through $203_n$ depicted in FIG. 2 are "actual", "virtual" or some combination of the two.

In an "actual" approach, separate circuit designs are partitioned from one another in order to implement the ports $203_1$ through $203_n$. As such, separate circuit regions manage the reception of their respective input traffic flows $204_1$ through $204_n$ and the transmission of their respective output flows $205_1$ through $205_n$. The separate circuit regions can also be designed to manage the manner in which inbound traffic units are presented to the switching core 201 for switching as well as manage the manner in which outbound traffic units are received from the switching core 201.

By contrast, the implementation of "virtual" ports corresponds to a more centralized approach in which a common circuit is designed to have the functional effect of n ports. As an example of a virtual approach, if the input queue(s) and output queue(s) of each port are implemented as different regions of a memory resource (e.g., a memory chip or embedded memory space), a large common circuit can be designed that performs some or all of the following: 1) "keeping track of" which memory regions correspond to which port; 2) checks each inbound traffic unit so that it can placed into its appropriate input queue (which effectively corresponds to the formation of an input traffic flow such as flow $204_1$ of FIG. 2); 3) keeping track of which enqueued traffic units are eligible to be switched/routed (or eligible to request to be switched/routed); 4) making appropriate notifications or requests to the core 201 for switching services, etc.

Regardless if an actual or virtual port design approach is utilized (or some combination of the two), the correct streams of inbound traffic units $204_1$ through $204_n$ should be formed within system 200. That is, the inbound traffic units sent to the system 200 should be directed to their appropriate input port. This can be done in a variety of ways. For example, in one approach, a port is reserved for the traffic being received from a physical network line (or a group of physical network lines). As such inbound traffic units received from a particular network line (or group of network lines) are directed to a particular port.

In another approach, inbound traffic units are collectively aggregated and the "header" information of each inbound traffic unit is looked into so that its appropriate input port can be determined. For example, a lookup table may be constructed that correlates specific header information (e.g., a source address of the sending agent, a connection identifier that identifies a connection in which a particular sending agent is engaged, etc.) to a particular input port. By checking each inbound traffic unit's header information and looking up its appropriate input port, each traffic unit can be directed to the "looked-up" input port.

Regardless, a distinction can be made between the input flows $204_1$ to $204_n$ that flow into the switch 200 and the flows that travel along the switch core inputs $202_1$ through $202_n$. Specifically, the former may be referred to as "raw" data flows and the later may be referred to as "logical" data flows. Generally, "logical" data flows correspond to that information which is actually switched by the switch core 201 during normal operation; and, "raw" data flows correspond that information which is actually received by the switch 200 during normal operation.

Although a large amount of overlap may exist between the two (e.g., wherein most of the raw data flow is a logical data flow), there are some differences between the data actually being sent on a network line and the data being switched by the switch core 201. The differences usually correspond to physical or link layer "overhead" (e.g., flow control packets) used to operate the network line. As this information is used to operate/maintain the network line itself, it is generally transparent or otherwise immaterial relative to the switch core 201. Thus, a logical input flow may often be viewed as being produced by stripping its raw input flow of its physical or link related overhead information. For simplicity the circuitry that performs this function is not shown in FIG. 2 (and likewise in the outbound direction).

It is often useful to know whether or not the circuitry that handles the switches traffic flows is operating properly during the debugging of the system 200. As such, according to the switch design of FIG. 2, any of ports $203_1$ through $203_n$ can be chosen to be a "port mirror" (i.e., port "$203_x$" where x is any integer from 1 to n). The port mirror $203_x$ provides, as its output flow $205_x$: 1) the "raw" input flow being presented to a "selected" port; 2) the "logical" input flow being sent from a "selected" port to the switch core 201 (e.g., along one of the Channel A inputs 202); or 3) the "logical" output flow being sent from the switch core 201 to a "selected" port (e.g., along one of the Channel A outputs).

Thus, as an example of the former case, if the raw input flow $204_1$ to port $203_1$ is "selected", the port mirror output flow $205_x$ effectively produces a duplicate copy of the flow of input traffic units $204_1$ presented to port $203_1$. And, as an example of the later case, if the output flow $205_2$ from port $203_2$ is "selected", the port mirror output flow $205_x$ effectively produces a duplicate copy of the flow of output traffic units $205_2$ being emitted from the port $203_2$ (which, in turn, were originally sent by the switch core 201 to output port $203_2$), etc.

Regardless of how the port mirror $203_x$ is configured to act as a port mirror, the port mirror output flow $205_x$ can then be routed out of the networking system 200 and into testing equipment (such as a logic analyzer, a computer or a "de-bug" board) that collects the traffic units from output flow $205_x$. As an example of just one de-bugging strategy, a testing agent may be configured to communicate with the networking system 200 through a port to port $203_1$.

The port mirror $203_x$ may then be configured to "select" the output for port $203_1$. A "test" stream of specific traffic units can then be sent by the testing agent to the networking system 200. The port mirror flow $205_x$ may then be used as a basis for determining whether output flow $205_1$ is "correct" (e.g., is the same as the flow sent by the testing agent); and, correspondingly, the proper operation of the system 200 can be verified.

Note that the switching core 201 may be viewed as having two channels: 1) an "A" channel that switches the "logical" flows, 2) a "B" channel that switches the "raw" flows to the core out put ports 208. According to the approach of FIG. 2, the raw input traffic flows $204_1$ through $204_n$ can be directed, respectively, along interface lines $207_1$ through $207_n$ (which correspond to the "B" channel inputs 207 to the switching core 201). The switching core 201 effectively acts as a multiplexer for the B channel input lines $207_1$ through $207_n$ in the sense that the raw traffic flow in the port that is "selected" to be mirrored is presented at switch core output $208_x$ (again, x being an integer from 1 to n).

For example, if port $203_1$ is the "selected" port for input port mirroring, the switch core 201 is configured so that the raw traffic flow on interface line $207_1$ is provided at switch core output $208_2$(where port 2 was chosen to be the mirror port). Thus, as interface line $207_1$ carries raw traffic flow $204_1$ raw traffic flow $204_1$ will appear at switch core output $208_2$. Thus, any of the raw input flows $204_1$ through $204_n$ can be made to appear at any switch core output $208_x$ by configuring the B channel of the switching core 201 to effectively couple switch core output $208_x$ to the interface line designed to carry the desired flow.

Note that each port $203_1$ through $203_n$ includes an input queue. For example, FIG. 2 has made a specific reference to the input queue 209 of input port $203_1$. The input queue 209 is responsible for holding the logical traffic units of port $203_1$ until the time is appropriate for them to be switched by the switching core 201. The switching core 201 and the output flows $205_1$ through $205_n$ may be viewed as having limited bandwidth. As such, various traffic units may have to "wait" until bandwidth resources are available for them.

Various forms of queuing may be implemented. For example, first-in-first-out (FIFO) queuing may be implemented. Alternatively, some form of pre-emptive queuing may be applied at an input port for purposes of implementing a priority scheme. That is "newer" inbound traffic units can be effectively placed "ahead of" older inbound traffic units within the queuing scheme of a port. Pre-emptive queuing is typically used if various classes of traffic flows exist such as a high priority traffic flow and a low priority traffic flow. The higher priority traffic classes tend to experience less delay in the input queuing scheme than the lower priority traffic class.

As seen in FIG. 2, the enqueued logical traffic flows are directed to the A channel of the switching core via interfaces $202_1$ through $202_n$. In the embodiment of FIG. 2, whereas the B channel may be viewed as being used as a "raw" flow port mirroring function, the A channel may be viewed as being used to provide 1) the substantive switching of the core 201; and 2) the function to mirror "logical" flows. The A channel of the switching core 201 is designed to switch any of the logical traffic flows on interfaces $202_1$ through $202_n$ to any of core outputs $208_1$ through $208_n$. This corresponds to the conversion of inbound traffic units to outbound traffic units during normal operation, and, accordingly, may be viewed as the substantive purpose of the switching core 201 during normal operation.

The A channel also provides for port mirroring via a switching characteristic known as "multicast". Multicast is a term used to describe the behavior of a switching or routing resource under circumstances where a networking communication has a single source but multiple destinations. For example, in the case of a conference telephone call, a speakers voice is broadcast to a plurality of telephones. As such, the telephony network "multicasts" the speakers voice from its source to the multiple destinations associated with the plurality of receiving telephones.

In a similar manner, a switching core 201 with multicast functionality has the ability to effectively transfer a single inbound traffic unit from its input port to a plurality of output ports. For example, the core 201 (or input port) may be designed to effectively "copy" a multicast inbound packet and transfer to each appropriate output port one of the copies made. Accordingly, in order to mirror a port's logical output traffic flow, traffic destined to the particular output port to be mirrored is configured as multicast traffic of dimension "1:2" (i.e. one source and two destinations), wherein one stream of core 201 output traffic flows to the output port to be mirrored and the other stream of core output traffic flows from the switch core channel A output $208_x$ (where x is the "selected" mirror port). As such, the logical flow sent from the switch core 201 to the port to be mirrored is captured by the port mirror $203_x$.

For example, a test agent may be configured to communicate through port $203_1$. If port $203_n$ is the output port to be mirrored, the test agent sends a stream of input flow traffic $204_1$ that is destined for port $203_n$ and port $203_x$. This may be accomplished in various ways such as configuring each of the traffic units within the stream of traffic $204_1$ to be configured with a multicast destination address that corresponds to: 1) a second test agent that is in communication with port $203_n$; and 2) test equipment that is configured to receive the output flow $205_x$ of the output port mirror $203_x$.

As such, a pair of output streams will flow from core outputs $208_n$ and $208_x$. The output stream that propagates from core output $208_n$ will be processed by output port $203_n$ and (if output port $203_n$ works correctly) eventually retransmitted as output flow $205_n$. The output stream that flows from core output $208_x$ will be processed by the output port mirror $203_x$ and transmitted to the testing equipment that collects output flow $205_x$. As such, output flow $205_x$ can be used to ensure that the switching core 201 is delivering the proper sequence of traffic units to port $203_n$. In general each port will be set to "mirror" flows destined for port $205_n$ to $205_x$, as only one flow can happen through $203_n$ the only one flow will happen through $203_x$. Note that it can be arranged that several output ports can be mirrored to different output ports at the same time, by describing the selections at each port, so that the appropriate mirroring can occur on channel "A".

In order to mirror a logical input flow (i.e., a flow appearing on any of the switch core interfaces $202_1$ through $202_n$, the switch core 201 can be configured to switch the particular A channel input to the core output $208_x$ that corresponds to the port mirror $203_x$.

Figure 3:
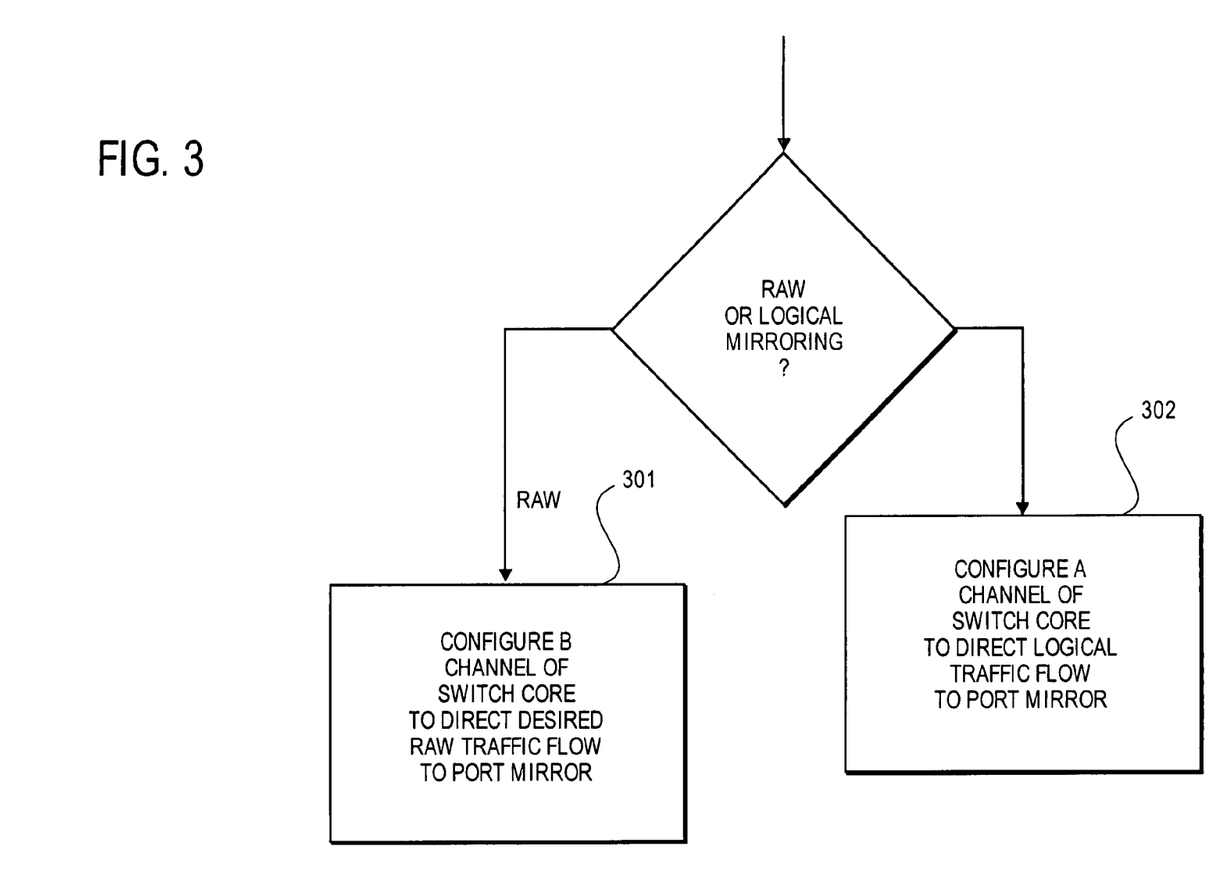
FIG. 3 shows raw and logical, port mirroring methodologies.

As a review, FIG. 3 shows, at a high level, a configuration methodology for port mirroring. As seen in the "raw" port mirroring methodology of FIG. 3, Channel B of the switching core is configured 301 so that the desired raw traffic flow is sent to the mirror port. As seen in the "logical" port mirroring methodology of FIG. 3, the Channel A switching core is configured 302 so that the desired logical traffic flow is directed to the port mirror.

Figure 4:
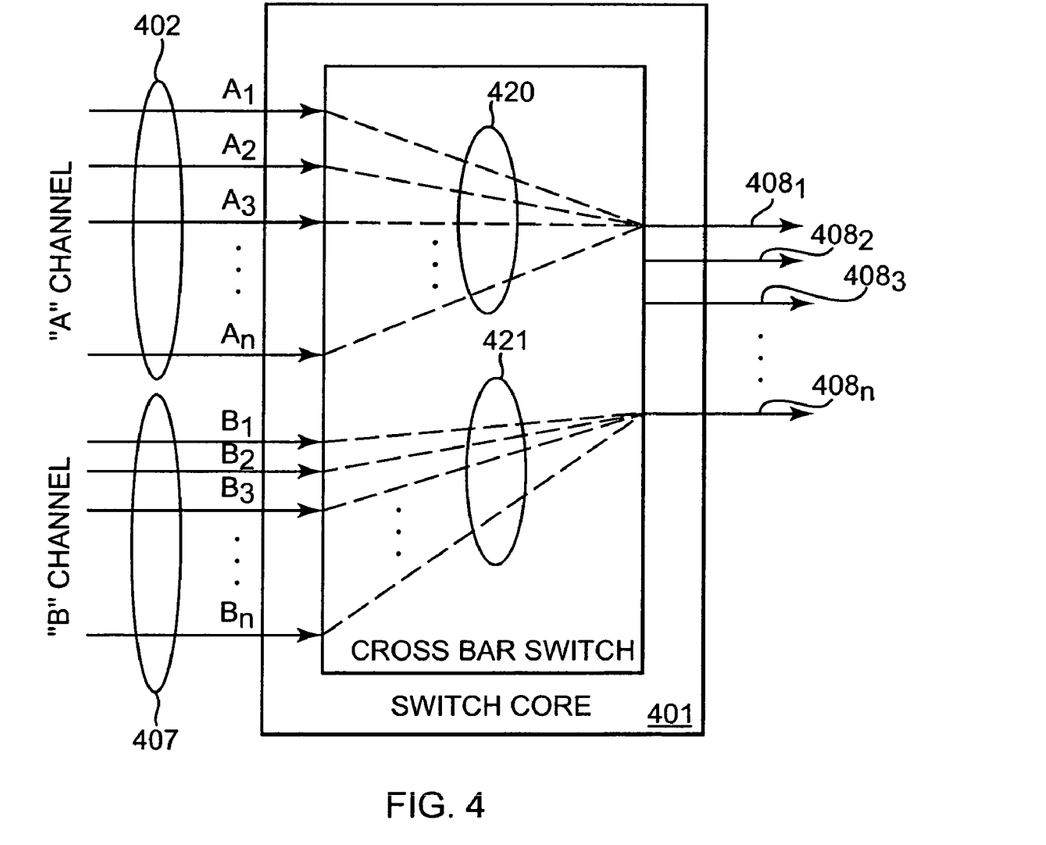
FIG. 4 shows a cross bar switch architecture that may be used with the networking system embodiment of FIG. 2.

FIG. 4 shows an embodiment of a switch core 401 that may be used for the switch core 201 of FIG. 2. As discussed, the switch core 401 has an "A" channel 402 (for normal switch activity and "logical" mirroring) and a "B" channel 407 (for "raw" mirroring). In the approach of FIG. 4, the switch core 401 is designed a cross bar switch. Cross bar switches may be viewed as being designed such that each output node $408_1$ through $408_n$ can be individually coupled to any of the input nodes. Circuit connections 420 demonstrates this relationship for output node $408_1$ for Channel A (each of output nodes $408_2$ through $408_n$ may be envisioned as having similar circuit collection). Circuit connections 421 demonstrates this relationship for output node $408_n$ for Channel B (each of output nodes $408_1$ through $408_{n-1}$ may be envisioned as having similar circuit collection).

The substantive switching activity of the channel A portion of the switch core 401 (during its normal operational mode) may be designed to work in cooperation with a scheduling circuit that "decides" the particular connection to be established for each switch core output node. For example, as just one approach, the scheduling circuit may be designed to "setup" a series of connections for each output node that allows an input traffic unit to be passed over each established connection.

Then, after the traffic units are passed over their established connections, the connections are "torn down" and a new set of connections are established. The faster that connections can be established and torn down, the greater he switching capacity of the core 401. The decision to make a particular connection may be based upon the bandwidth of the input and output flows as well as the priority of the traffic units that are involved.

Multicast connections are created by having at least a pair of output nodes coupled to the same input node. If node $408_x$ (where x is from 1 to n) is configured as the multicast output for another core output, such as during the mirroring of an output port, the connections established for node $408_x$ are the same as those for the other core output.

Figure 5:
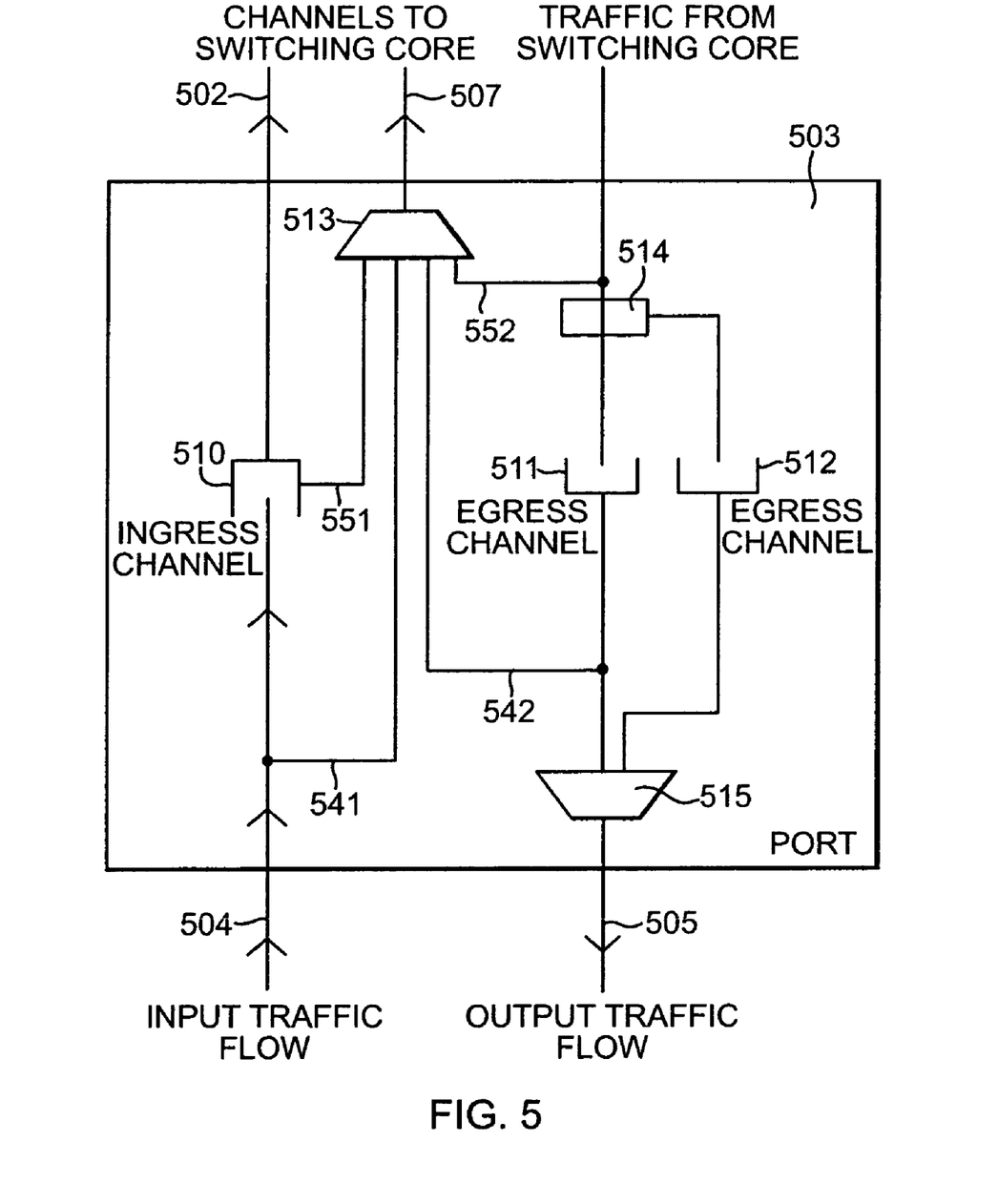
FIG. 5 shows an embodiment of a port that may be used with the network embodiment of FIG. 2

FIG. 5 shows an embodiment of a port 503 that may be used for any of ports $203_1$ through $203_n$ of FIG. 2. The port 503 includes an ingress channel 510 and an egress channel 511. As such, the port's input traffic flow 504 is directed to the ingress channel 510. The ingress channel 510 provides an input traffic stream to the switching core. Ingress channel 510 may be viewed as the circuitry that implements the input queuing for the port 503 (if any). The egress channel 511 receives an output traffic stream from the switching core. The port's output traffic flow 505 is then directed from the egress channel 511. Ingress channel 510 may be viewed as the circuitry that implements the output queuing for the port 503 (if any).

Port output 507 corresponds to any of channel B input lines 207 of FIG. 2 (depending on which of the ports $203_1$ through $203_n$ of FIG. 2 that port 503 of FIG. 5 corresponds to). Multiplexer 513 allows for port output 507 to provide either the traffic being presented to the core prior to the ingress channel 510 "raw" input flow 541; or, the traffic being sent on the 505 after the egress channel 511 "raw" output flow 542. As such, if the port embodiment 503 of FIG. 5 is employed, an input flow to the port 503 or an output flow from the core can be directed to the core's B channel and then to the mirror port $203_x$. As such, non-multicast test vehicle streams can be employed.

An embodiment of this might have a logical unit on the input side 510 that provides a plurality of channels to the switching core 502, in which case it will be difficult to mirror the logical flow to one mirror port. A serial "logical" input stream in 510 can be supplied to the "B" channel through 513 via 551 to achieve this mirror function. Similarly the "logical" output stream could be supplied to 513 and hence a mirror port via 552. Thus in such an embodiment it is possible to mirror "logical" flows via the "B" channel. The switch at 514 enables "logical" and "raw" flows to be split (configured when setting up the mirror port), so that the "raw" retiming can be handled at 512 prior to its exit from the port through 515 to 505. Whereas the "logical" flows go through 511, which adds the framing and control packets required to support the protocol, then through 515 to the link 505.

Note that the logical flows using the core's A channel from 502 can be "multicast" to a mirror port $203_x$, as can logical flows to 507, which are "multicast" as appropriate from the other ports $203_1$ to $203_n$ (which does not include the port to be mirrored or the mirror port) to a mirror port $203_x$.

Only one flow 541, 542, 551, or 552 can be mirrored at a time, configuration will determine which. An implementation can support all or any of these mechanisms. If an implementation chooses not to support a "B" channel then it can use the multicast mechanisms on the "A" channel.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or with a machine readable medium. A machine readable medium includes any mechanism for strong or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

What is claimed is:

1. A networking system, comprising:
a plurality of ports, each configured to send and receive data;
a switch core having a first channel configured to receive a logical input flow data from each of the plurality of ports, and having a second channel configured to receive a raw input flow data from each of the plurality of ports, wherein each logical input flow data is carried by its corresponding raw input flow data;
a plurality of port mirrors selectable from the plurality of ports, wherein each of the plurality of port mirrors is configured to provide a duplicate copy of at least one of the logical input flow data and the raw input flow data available at a selected port; and
wherein each of the plurality of ports includes a switch configured to receive an output of the switch core and configured to separate the logical input flow data from the raw input flow data.

2. The networking system of claim 1, wherein the switch core is configured to provide multicast connections between an input node and a plurality of output nodes.

3. The networking system of claim 2, wherein each of the plurality of ports comprises:
an ingress channel configured to send input flow data to the switch core;
an egress channel configured to receive output flow data from the switch core; and
a multiplexer configured to provide raw input flow to at least one of the switch core and the egress channel.

4. The networking system of claim 3, wherein the switch core comprises a cross bar switch.

5. The networking system of claim 3, wherein the switch core comprises a semiconductor chip.

6. The network system of claim 3, wherein the switch core comprises a computer-readable medium having computer-executable instructions.

7. The networking system of claim 3, comprising a scheduling circuit, wherein the scheduling circuit is configured to establish a set of connections for each of a plurality of output nodes allowing data to be passed from at least one of the first channel and the second channel over each of the established set of connections.

8. The networking system of claim 3, comprising:
an input queue configured to hold a plurality of logical traffic units of the logical input flow data prior to switching at the switch core.

9. A networking system comprising:
means for receiving and sending input flow data;
means for switching at least one of a raw input flow data and a logical input flow data; and means for producing a duplicate copy of at least one of the logical input flow data and the raw input flow data available at the means for receiving and sending input flow data.

10. The networking system of claim 9 comprising:

means for holding a plurality of logical traffic units of the logical input flow data prior to switching at the switch core.

11. The networking system of claim 10, wherein the means for receiving and sending data includes a switch configured to receive an output of the switch core and separate the logical input flow data from the raw input flow data.

12. The networking system of claim 11, wherein the means for switching comprises a means for providing multicast connections between an input node and a plurality of output nodes.

13. The networking system of claim 11, wherein the means for switching the logical input flow data and the raw input flow data comprises a cross bar switch.

14. A method of operation of a networking system, the method comprising:

sending and receiving data at a plurality of ports;

receiving a logical input flow data at a first channel of a switch core and a raw input flow data at a second channel of the switch core from each of the plurality of ports;

switching the logical input flow data received at the first channel and the raw input flow data received at the second channel using the switch core;

selecting a plurality of port mirrors from the plurality of ports;

generating a duplicate copy of at least one of the logical input flow data and the raw input flow data; and providing the duplicate copy at the selected plurality of port mirrors.

15. The method of claim 14 comprising:

debugging the networking system using the duplicate copy provided at the selected plurality of port mirrors.

16. The method of claim 14, wherein debugging the networking system includes using a test agent configured to communicate to the plurality of ports.

17. The method of claim 14 comprising:

separating the logical flow data from the raw input flow data using a switch provided at each of the plurality of ports.

18. The method of claim 17 comprising:

queuing a plurality of logical traffic units of the logical input flow data prior to switching at the switch core.

19. The method of claim 18, wherein switching data received at the first channel and the second channel includes using a cross bar switch.

20. The method of claim 19, wherein the cross bar switch is configured to provide multicast connections between an input node and a plurality of output nodes.

* * * * *

UNITED STATES PATENT AND TRADEMARK OFFICE
CERTIFICATE OF CORRECTION

PATENT NO.       : 7,209,476 B1
APPLICATION NO.  : 09/977604
DATED            : April 24, 2007
INVENTOR(S)      : Ian Colloff It is certified that error appears in the above-identified patent and that said Letters Patent is hereby corrected as shown below:

Col. 2 Line 15 Delete "Asciento," and insert -- Ascierto, --, therefor.

Col. 8 Line 38 In Claim 3, delete "2," and insert -- 1, --, therefor.

Col. 10 Line 12 In Claim 16, delete "14," and insert -- 15, --, therefor.

Signed and Sealed this

Sixteenth Day of December, 2008

JON W. DUDAS
*Director of the United States Patent and Trademark Office*